United States Patent
Tsumori et al.

(10) Patent No.: US 6,956,233 B2
(45) Date of Patent: Oct. 18, 2005

(54) PLATED SUBSTRATE FOR HARD DISK MEDIUM

(75) Inventors: Toshihiro Tsumori, Fukui-ken (JP); Masatoshi Ishii, Fukui-ken (JP); Naofumi Shinya, Fukui-ken (JP); Yu Hamaguchi, Fukui-ken (JP); Yukimi Jyoko, Sabae (JP)

(73) Assignee: Sin-Etsu Chemical Co., Ltd., Tokyo (JP)

( * ) Notice: Subject to any disclaimer, the term of this patent is extended or adjusted under 35 U.S.C. 154(b) by 60 days.

(21) Appl. No.: 10/646,500

(22) Filed: Aug. 22, 2003

(65) Prior Publication Data

US 2004/0035822 A1 Feb. 26, 2004

(30) Foreign Application Priority Data

Aug. 26, 2002 (JP) ........................................ 2002-244839

(51) Int. Cl.$^7$ .............................................. H01L 29/04
(52) U.S. Cl. ...................... 257/52; 428/694 T; 428/692; 428/694 TS; 428/694 TM; 428/666; 428/667; 428/678
(58) Field of Search ............................. 428/694 T, 692, 428/694 TS, 694 TM, 666, 667, 678

(56) References Cited

U.S. PATENT DOCUMENTS 5,612,146 A  3/1997  Komura et al. .......... 428/694 T

FOREIGN PATENT DOCUMENTS

| JP | 145140 | 7/1982 |
|---|---|---|
| JP | 142048 | 1/1984 |
| JP | 241089 | 6/1984 |
| JP | 259523 | 6/1986 |
| JP | 4259908 | 9/1992 |
| JP | 668463 | 3/1994 |
| JP | 628655 | 5/1994 |

Primary Examiner—David Nhu
Assistant Examiner—Mai-Huong Tran
(74) Attorney, Agent, or Firm—Myers Bigel Sibley & Sajovec, PA

(57) ABSTRACT

In plating on an Si substrate, it has been strongly demanded to apply a treatment for providing an excellent adhesion so as to resist a post-processing such as polishing and for facilitating plating. Then, provided is a plated substrate adapted for hard disk medium comprising an Si single crystal; an amorphous layer on the substrate, the amorphous layer having thickness of 2 to 200 nm and containing Si and one or more metals selected from a group consisting of Ni, Cu and Ag; a multicrystal layer on the amorphous layer, the multicrystal layer having thickness of 5 to 1000 nm and containing Si and one or more metals selected from a group consisting of Ni, Cu and Ag. Moreover, provided is a method for manufacturing a plated substrate adapted for hard disk medium comprising steps of applying a chemical etching treatment of a natural oxide film and a surface Si portion on an Si single crystal substrate; and forming a film on the etched surface of the substrate in a sulfate or hydrochloride bath containing no reductant within a pH range of 7.2 to 12.8 at liquid temperature of 70 to 100° C.

1 Claim, 4 Drawing Sheets

PLATED SUBSTRATE FOR HARD DISK MEDIUM

CROSS-REFERENCE TO RELATED APPLICATIONS

The present application claims priority to Japanese Patent Application No. 2002-244839, filed Aug. 26, 2002, the disclosure of which is incorporated herein by reference in its entirety.

BACKGROUND OF THE INVENTION

1. Field of the Invention

The present invention relates to a plated substrate for hard disk medium and a manufacturing method thereof.

2. Description of the Related Art

Si single crystal substrates have been widely used as semiconductor wafers because of purity and ease of patterning. Furthermore, recently, by taking advantage of excellent characteristics in rigidity, surface smoothness, stability of surface state, etc., utilization thereof as high recording density magnetic recording substrates have also been examined as disclosed in, for example, Japanese Patent Publication (JP-B) No. 1-42048/'89, Japanese Patent Publication (JP-B) No. 2-41089/'90, Japanese Patent Publication (JP-B) No. 2-59523/'90, Japanese Patent Publication (JP-B) No. 1-45140/'89, Japanese Patent Provisional Publication (JP-A) No. 57-105826/'82, Japanese Patent Provisional Publication (JP-A) No. 6-68463/'94, Japanese Patent Provisional Publication (JP-A) No. 6-28655/'94, and Japanese Patent Provisional Publication (JP-A) No. 4-259908/'92.

When an Si single crystal is used as an electronic material or as a magnetic recording material, it is necessary to coat the surface thereof with a metal film for installation of electrodes or application of a magnetic material. Such metal film coating on an Si substrate has been carried out by vapor deposition under vacuum such as sputtering method.

However, in recent years, in LSI manufacturing, because of population of the damascene process, etc., and an application of manufacturing perpendicular magnetic recording media in the field of magnetic recording materials, it has become necessary to provide a thick metal film coating which allows polishing.

Accordingly, various attempts to coat an Si substrate with a metal film have been examined by a plating method, which can easily realize a thick film compared to vapor deposition under vacuum.

In order to provide plating having excellent adhesion by wet-process plating, it is important that a substance which can be a catalyst for reducing metal ions in a plating liquid exists in large quantities in a junction part between a parent material and a plating film. Furthermore, the greatness in adhesion between the formed plating film and plated parent material depends on a mechanical anchoring effect due to a surface unevenness of the plated material or a chemical interaction between the plated material and plating film.

For example, in order to provide plating on the surface of a material low in chemical reactivity such as a plastic, ceramic or glass material, a method has been widely carried out, wherein after roughening the parent material surface by polishing, etc., colloidal particles are firmly fixed to surface concavities by an immersion in a Pd—Sn colloid solution, and plating is carried out by using this colloid adhesion as a catalytic origin so that adhesion resulting from a mechanical anchoring effect can be secured.

On the other hand, in plating on a metal such as Fe, a metallic bond is formed-between the plating film and plated metal immediately after the start, and occurrence of alloying at an atomic layer level secures a strong adhesion.

Si, which is used as a plating parent material, is considerably high in reactivity with respect to oxygen, and in a few hours after manufacturing, its surface is already covered with an $SiO_2$ natural oxide film of a low chemical activity and is passivated. Therefore, it is difficult to form a chemical bond with a plating film.

It is widely known that such a natural oxide film on an Si surface can be resolved and removed by an HF immersion, etc. However, since the Si surface after removal of the natural oxide film is considerably easily oxidized, if it is immersed in a plating liquid, an oxide film is formed by a reaction with OH groups in the liquid before a plating film is formed. Therefore, a satisfactory plating film cannot be obtained.

Accordingly, plating on an Si substrate is carried out by one of the following methods. In a similar manner to the plating on plastic, etc., as mentioned in the foregoing, the substrate is, after roughening the substrate surface, immersed in Pn-Sn colloid for plating. Or after introducing a metal layer by vapor deposition such as a sputtering method, plating is provided on this metal layer.

However, in the method where plating is carried out after roughening the substrate, it becomes necessary to increase the roughness of the substrate surface for a further improvement in adhesion of the plating film. Therefore, this is not preferable for plating on a semiconductor wafer, etc., used for an electronic material, etc. In addition, when the substrate surface is roughened by machining, a problem arises such that machining causes processing traces and, depending on the size and shape of the processing traces, substrate strength may be considerably deteriorated.

On the other hand, when plating is carried out after introducing a metal layer on the Si substrate surface by vapor deposition, in order to carry out counter diffusion between the Si substrate and metal layer at an atomic level, it is necessary to carry out heat annealing during deposition or after deposition. In this case, since metal activation immediately after deposition is lost by thermal annealing, it is necessary to reactivate the deposited metal film by a Pd—Sn catalysis, etc., before plating as a pretreatment. In addition, there exists a problem such that since vapor deposition of dry film formation and wet-process plating are simultaneously employed, the equipment is complicated and increased in size.

SUMMARY OF THE INVENTION

As in the above, in plating on an Si substrate, it has been strongly demanded to apply a treatment for providing an excellent adhesion so as to resist a post-processing such as polishing and for facilitating plating.

The present invention aims to provide, on an Si single crystal substrate after mirror polishing, a metal film coating having an adhesion strong enough to be a plating base by means of only a wet processing.

More specifically, the present invention provides a plated substrate adapted for hard disk medium comprising a Si single crystal substrate; an amorphous layer on the substrate, the amorphous layer having thickness of 2 to 200 nm and containing Si and one or more elements selected from a group consisting of Ni, Cu, and Ag; and a multicrystal layer on the amorphous layer, the multicrystal layer having thickness of 5 to 1000 nm and containing Si and one or more elements selected from a group consisting of Ni, Cu, and Ag; and a manufacturing method thereof.

DETAILED DESCRIPTION OF THE PREFERRED EMBODIMENTS

Figure 1:
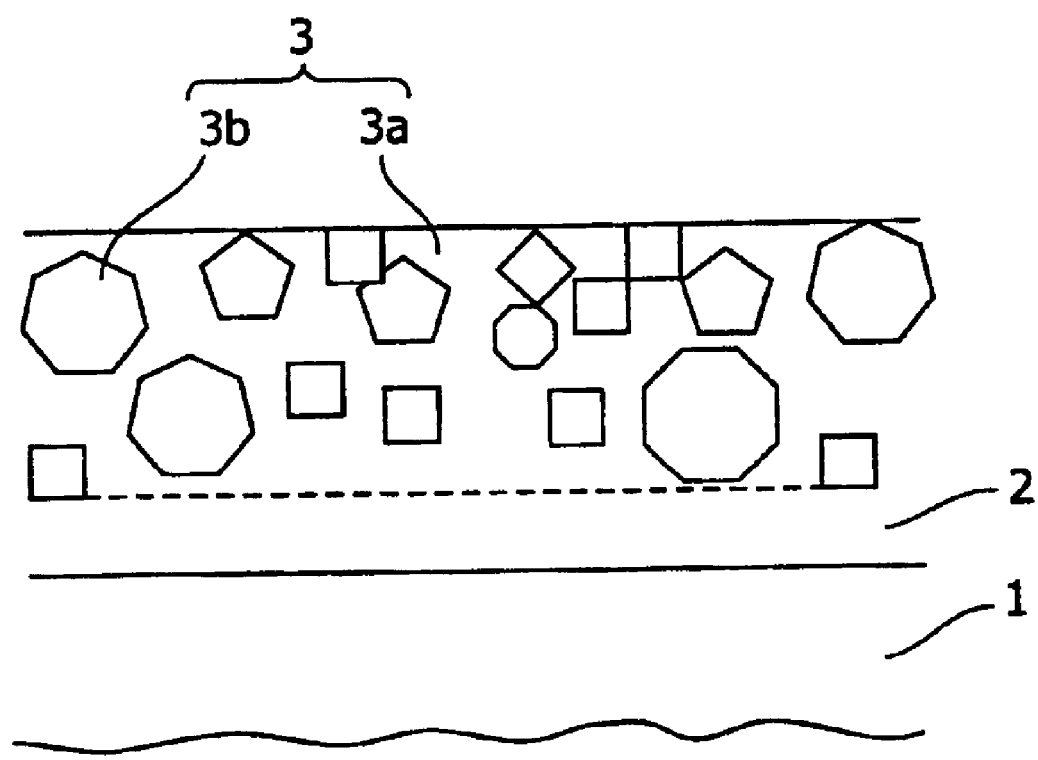
FIG. 1 shows a schematic view of a base film of the present invention.
Figure 2:
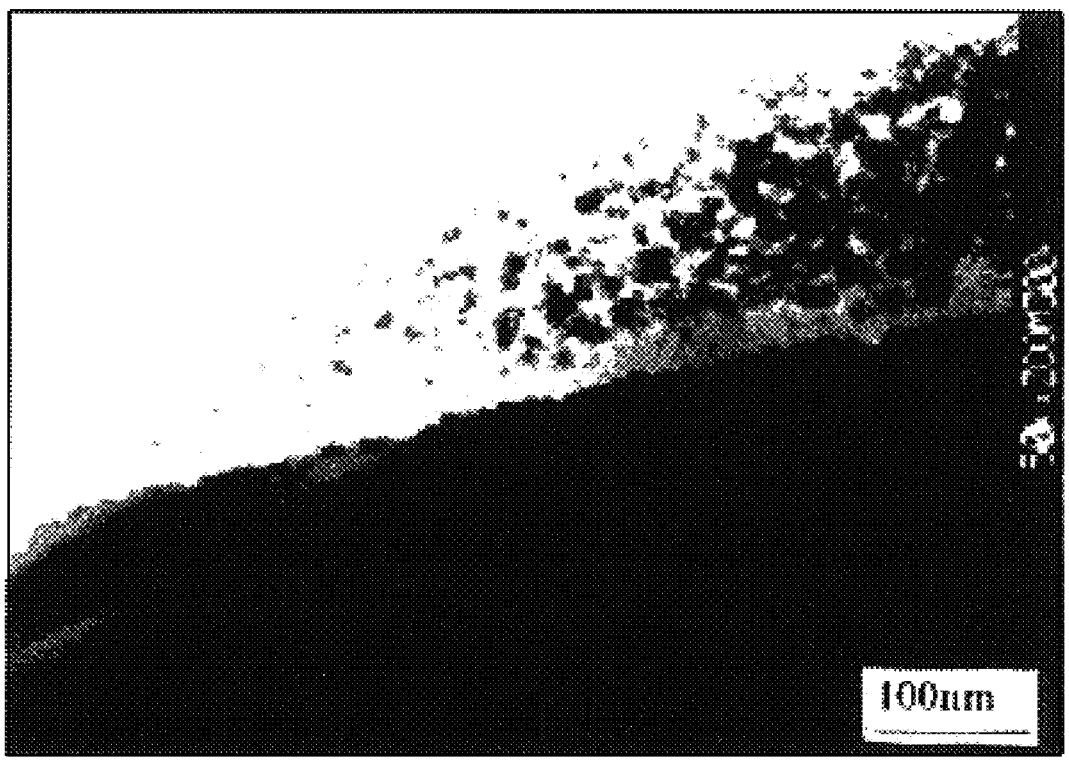
FIG. 2 shows a transmission electron micrograph of a film section (magnificat ion: approximately 210,000×)
Figure 3:
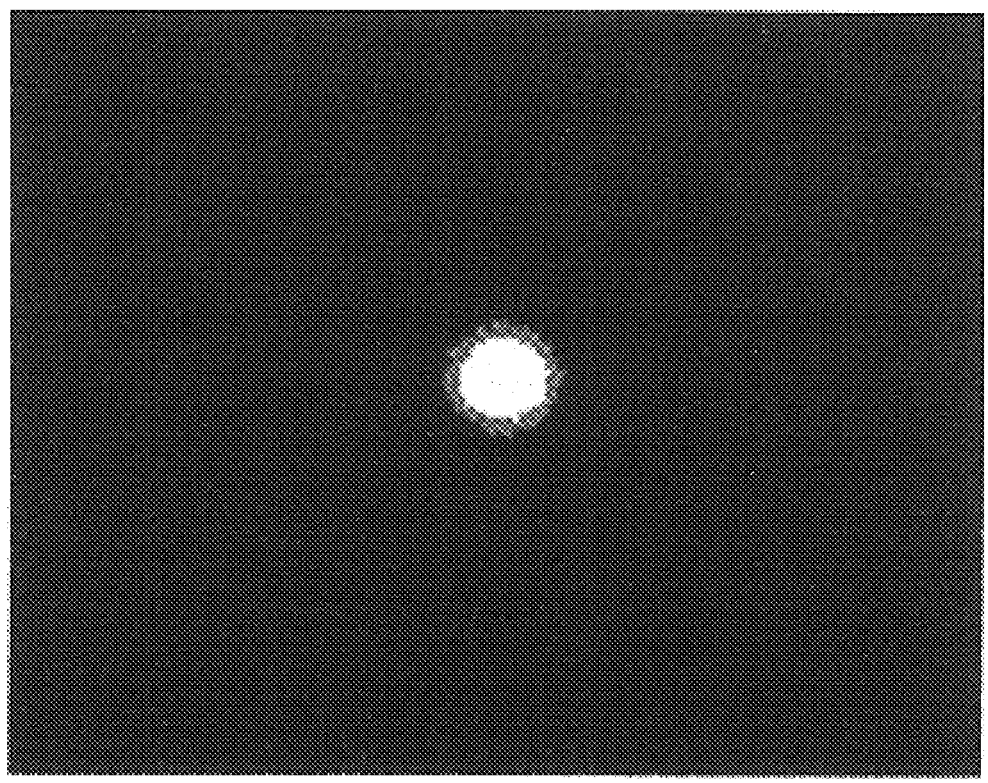
FIG. 3 shows an electron diffraction pattern of an amorphous phase.
Figure 4:
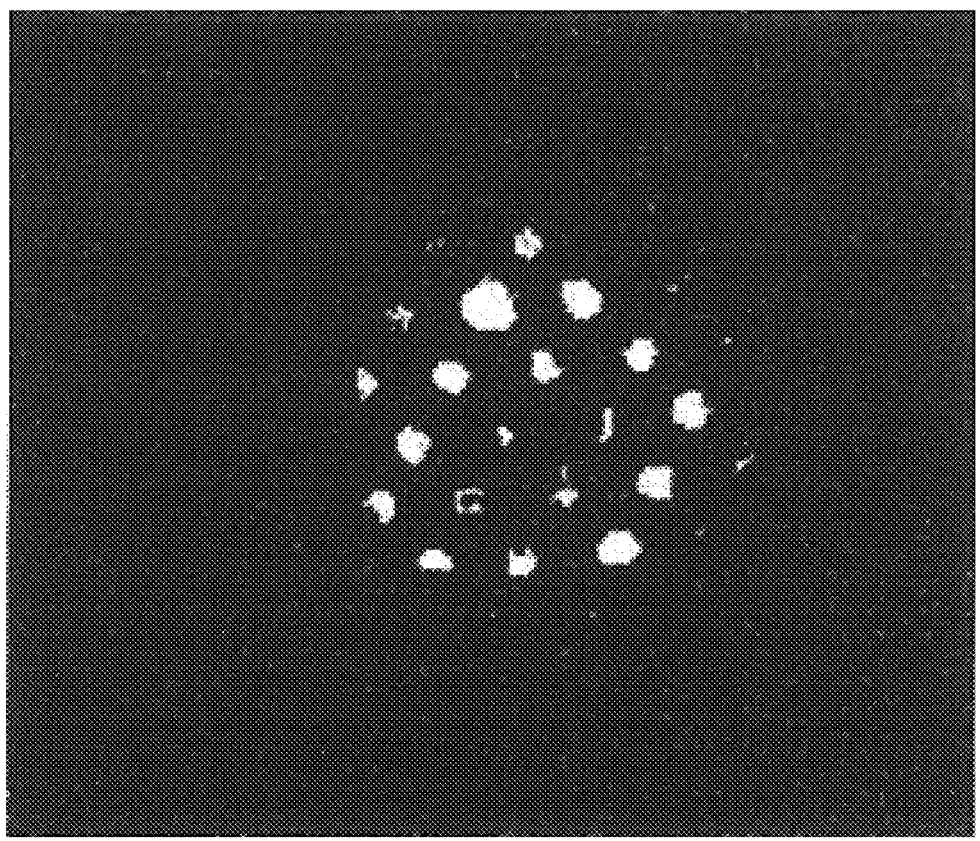
FIG. 4 shows an electron diffraction pattern of a metallic crystal phase.

A schematic view of a base film of the present invention is shown in FIG. 1, and a transmission electron micrograph of a film section is shown in FIG. 2. Moreover, electron diffraction patterns of an amorphous phase and a metallic crystal phase are shown in FIG. 3 and FIG. 4.

As shown herein, a high-adhesion plating material of the present invention is chemically bonded to the surface of a substrate because the amorphous layer 2 just on the Si substrate 1 contains a large amount of Si element derived from a parent material of the Si substrate 1. The amorphous layer is 2 to 200 nm, preferably 5 to 20 nm in thickness, and shows a hallo pattern peculiar to an amorphous substance by electron diffraction. The thickness is provided as 2 to 200 nm is because, if less than 2 nm, formation of a uniform amorphous layer is considerably difficult and, if more than 200 nm, adhesion to the upper layer, a multicrystal layer, is deteriorated. The amorphous layer comprises Si of the parent material and one or more metallic elements selected from a group consisting of Ni, Cu, and Ag in an atomic ratio of (Si):(a total of Ni, Cu, and Ag)=(200:1) to (2:1). Moreover, the portion of metallic component becomes higher as the distance from the Si substrate becomes longer. Consequently, the adhesion between the substrate and the amorphous layer is enhanced. Furthermore, as an additional component, the amorphous layer may comprise a slight amount of a light element such as oxygen or hydrogen.

A multicrystal layer 3 is formed on the amorphous layer 2. The multicrystal layer 3, wherein a low-crystallinity part 3a and a crystal phase part 3b are mixed, has the thickness of 5 to 1000 nm. The low-crystallinity part 3a contains Si and one or more elements selected from a group consisting of Ni, Cu and Ag in an atomic ratio of (Si):(a total of Ni, Cu and Ag)=(100:1) to (1:1), preferably (50:1) to (2:1). The crystal phase part 3b contains Si and one or more elements selected from a group consisting of Ni, Cu and Ag in an atomic ratio of (Si):(a total of Ni, Cu, and Ag)=(1:1) to (1:200), preferably (1:5) to (1:100). The thickness of the multicrystal layer is provided in this range because, if less than 5 nm, uniform distribution of the individual multicrystal grains in the layer cannot be obtained and, if more than 1000 nm, individual crystal grains are bloated, which is not preferable for a base film.

There may be cases where the low-crystallinity part of the mixed crystal layer and the amorphous layer just on the substrate can be clearly distinguished based on a transmission electron micrographic image. However, there may be cases where, depending on the type of metal or the manufacturing method employed in the present invention, the composition and crystallinity are continuously changed so that the boundary therebetween becomes unclear.

In terms of the structure of the mixed crystal layer, there may be cases where the low-crystallinity part 3a indicates a slight diffraction pattern in addition to a hallo pattern peculiar to amorphous crystals by electron diffraction. On the other hand, the metallic crystal phase 3b indicates a nearly perfect crystal diffraction pattern by electron diffraction so that it can be clearly distinguished.

Thus, a hard disk substrate having high-adhesion plating of the present invention comprises a component of the mixed crystal layer having a structure in which minute metallic crystal phases to be growth cores of plating are dispersed in the low-crystallinity phase. The Si substrate, amorphous layer, and mixed crystal layer respectively contain similar elements across the boundaries, whereby a strong adhesion to the substrate is secured while metallic crystal phases required as growth origins of plating are formed in the surface layer of an enhanced adhesion layer.

According to the present invention, the respective layers on the Si substrate are formed to yield a high-adhesion plating material prior to further plating thereon. Thus, a plating film having an excellent adhesion can be obtained without roughening the substrate surface or applying various activation treatments.

In addition, the wet electroless substitution plating for the present invention is a simpler process compared to a base film introduction by a deposition method, etc. Furthermore, since the surface activity of the film formed in the present invention is high, the film is excellent as a base film for further plating so that continuous plating can be carried out without particular activation.

Next, a manufacturing method of the present invention will be described.

When carrying out the present invention, an Si single crystal material manufactured by a CZ (Czochralski) method or a FZ (Floating Zone) method may be used as the substrate. The surface orientation of the substrate may be arbitrary, including (100), (110) and (111). In addition, the substrate may comprise a total amount of 0 to $10^{22}$ atoms/$cm^2$ of impurity including elements such as B, P, N, As and Sn.

However, when multicrystal Si having different surface orientations on the same plane and Si having-excessive impurity segregation are used for a substrate, a formed base film may have nonuniformity owing to the difference in chemical reactivity therebetween. Moreover, when a substrate having extreme segregation is used, the base film having the prescribed structure of the present invention may become impossible to obtain because of a local battery formed at a segregated part of the substrate surface during the base film formation.

According to the present invention, slightly etching oxide film on the surface of the Si substrate as well as the surface thereof, can afford activation necessary for formation of a base film.

As a method to remove the oxide film, an impregnation into an aqueous solution of 2 to 10% by weight HF has been widely carried out in the semiconductor industry, etc. However, in this method, although a natural oxide film, namely, $SiO_2$ can be removed, etchability of Si itself as a parent material is low so that activation of the substrate surface necessary for forming a base film is not carried out. Thus, this method may not be suitable in some cases.

According to the present invention, a substrate is etched in an aqueous solution of 2 to 60% by weight caustic soda to remove an oxide film on the surface and to slightly corrode the substrate surface. The etching speed preferable for activation on the parent material may be 20 nm/minute to 5 $\mu$m/minute. The preferable etching amount may be removal of 40 nm or more parent material Si. Although the solution temperature during etching may be variable depending on the concentration and treatment time, it is preferably in a range of 30 to 100° C. in view of workability.

After such an etching treatment, the substrate is immersed in a plating solution containing ion of one or more metals selected from a group consisting of Ni, Cu, and Ag, or containing said ion as main metal ion at concentration of 0.01N or more, preferably 0.05 to 0.3N in terms of element constituents. As a result, surface layers are formed so that a high-adhesion plating material is obtained.

In film formation, a film may be manufactured by a method generally known as electroless (or nonelectrolytic) substitution plating. The fact that no component for potential reductant such as hypophosphorous acid or hypochlorous acid is contained in the solution is in the same manner as conventional substitution plating. However, according to the present invention, particularly preferably, a sulfate bath containing no component for a brightener such as saccharin can be used. The sulfate includes nickel sulfate and copper sulfate and a preferred concentration thereof may be 0.01 to 0.5N.

A hydrochloride bath or a bath containing 0.05N or more chlorine ions may bring not only difficulty to obtain a base film of the present invention but also impossibility to carry out plating itself on an Si substrate in some cases, thus not being preferable. In addition, when each element such as K, Ca or Na is present in concentration of 0.003N or more in the liquid is also not preferable in the present invention. Accordingly, chlorine ions may be present in concentration of less than 0.05N, and K, Ca, Na, etc., may be present in concentration less than 0.003N, respectively.

According to the present invention, it is necessary to maintain a pH range of 7.2 to 12.8, more preferably 7.6 to 8.4 at liquid temperature of 70 to 100° C. in the bath. When the plating liquid temperature is less than 70° C., plating is impossible. When the plating liquid temperature exceeds 100° C. or when pH at said temperature during the plating for forming film is out of a prescribed range, a base film according to the present invention cannot be obtained although plating itself is possible. In the manufacturing process, pH control is a prerequisite and a control method therefor can be limited to an ammonia addition. Although the amount of the ammonia to be added has to be adjusted based on the initial pH, in general, it may be sufficient to add ammonia in the plating bath by a range of 0.02 to 0.5N, preferably 0.05 to 0.2N.

By carrying out substitution plating under the above condition, the prescribed amorphous layer and multicrystal layer are laminated in order. (Specific properties and film thickness may be adjusted by controlling the plating condition whenever necessary.)

When pH control is carried out by hydroxide including caustic soda, and even if the pH is set to be in the prescribed range, it may be difficult to obtain the film of the present invention.

Although the reason why pH control may be limited to an ammonium addition is not completely clear, it is presumed from experimental results that it is considerably important according to the present invention that metal ions in the liquid are made into complex ions by a complex forming agent such as ammonia.

By using the above etching treatment and base plating treatment together, formation of the base film of the present invention can be achieved.

Hereinafter, although the present invention will be described based on examples, the present invention is not limited hereto.

EXAMPLE 1

Both surfaces of a (100) Si single crystal (a P-doped N-type substrate) having a diameter of 65 mm, which had been produced by cutout, edge-removal and lapping of a single crystal substrate with diameter of 200 mm fabricated by the CZ method, were polished by colloidal silica having a mean particle size of 15 nm and were smoothed to a surface roughness (Rms) of 4 nm. The Rms means a square mean roughness, which was measured by means of an AFM (atomic force microscope). This substrate was immersed in an aqueous solution of 10 wt % caustic soda for three minutes to remove a thin surface oxide film on the substrate surface and to etch the Si surface.

Next, a bath for base plating was prepared by adding 0.5N ammonium sulfate to an aqueous solution of 0.1N nickel sulfate. Further, the pH of the solution was raised to 9.8 by adding ammonia water. When the solution was heated to 80° C. and pH was measured again, the pH value was 7.6. While the ammonia water was continuously supplied until the pH at 80° C. became 8.0 (ammonia was 0.1N in a total amount), the Si substrate etched in advance was immersed in the plating bath for five minutes to obtain a high-adhesion plating material of the present invention.

The observation of the surface portion of this material by a transmission electron microscope confirmed a 6 nm-thick amorphous layer on the Si substrate and a 150 nm-thick mixed crystal layer on the amorphous layer. Furthermore, a compositional ratio (atomic ratio) at the amorphous part of Si to the metal component examined with EPMA was Si:Ni=19:1. In addition, as for the mixed crystal layer, a compositional ratio (atomic ratio) at the low-crystallinity part was Si:Ni=3:2, and the ratio at the crystalline part was Si:Ni=1:10.

The peel-away test by making a lattice-shaped cut into this base plating film at 5 mm-intervals, applying an adhesive tape thereon, and peeling the tape was carried out. As the result, no peel of the plating film was found.

EXAMPLE 2

Both surfaces of a (100) Si single crystal (a B-doped P-type substrate) having a diameter of 65 mm, which had been obtained from the treatments by cutout, edge-removal and lapping of a Si single crystal substrate with diameter of 200 mm fabricated by the CZ method, were polished by colloidal silica having a mean particle size of 15 nm and were smoothed to a surface roughness (Rms) of 4 nm (measurement by an AEM). This substrate was immersed at 50° C. in an aqueous solution of 45 wt % caustic soda for two-minutes to remove a thin surface oxide film on the substrate surface and to etch the Si surface.

Next, a bath for base plating was prepared by adding an aqueous solution of 0.2N ammonium sulfate to an aqueous solution of 0.2N copper sulfate. Furthermore, the pH of the solution was raised to 8.3 by adding the ammonia water. When this solution was heated to 80° C. and pH was measured again, the pH value was 6.9. While the ammonia water was continuously added until pH at 80° C. became 8.0 (ammonia was 0.2N in a total amount), the Si substrate etched in advance was immersed in the plating bath for seven minutes to obtain a high-adhesion plating material of the present invention.

The observation of the surface portion of this material by a transmission electron microscope confirmed a 12 nm-thick amorphous layer on the Si substrate and a 180 nm-thick mixed crystal layer on the amorphous layer. Furthermore, a compositional ratio (atomic ratio) of Si to the metal component at the amorphous part examined with EPMA was Si:Cu=20:1. In addition, as for the mixed crystal layer, a compositional ratio (atomic ratio) at the low-crystallinity part was Si:Cu=5:1 and the ratio at the crystalline part was Si:Cu=1:15.

The peel-away test by making a lattice-shaped cut into this base plating film at 5 mm-intervals, applying an adhesive tape thereon, and peeling the tape was carried out. As the result, no peel of the plating film was found.

What is claimed is:

1. A plated substrate adapted for hard disk medium comprising
    a Si single crystal substrate;
    an amorphous layer on the substrate, the amorphous layer having thickness of 2 to 200 nm and containing Si and one or more metals selected from a group consisting of Ni, Cu and Ag; and
    a multicrystal layer on the amorphous layer, the multicrystal layer having thickness of 5 to 1000 nm and containing Si and one or more metals selected from a group consisting of Ni, Cu and Ag.

* * * * *